L. R. EWART.
LAMP MOUNTING ATTACHMENT FOR VEHICLES.
APPLICATION FILED AUG. 2, 1917.
1,266,239.
Patented May 14, 1918.
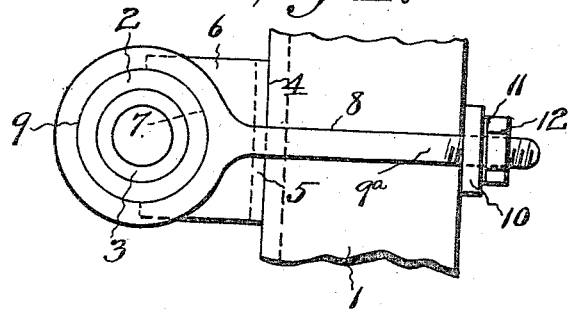
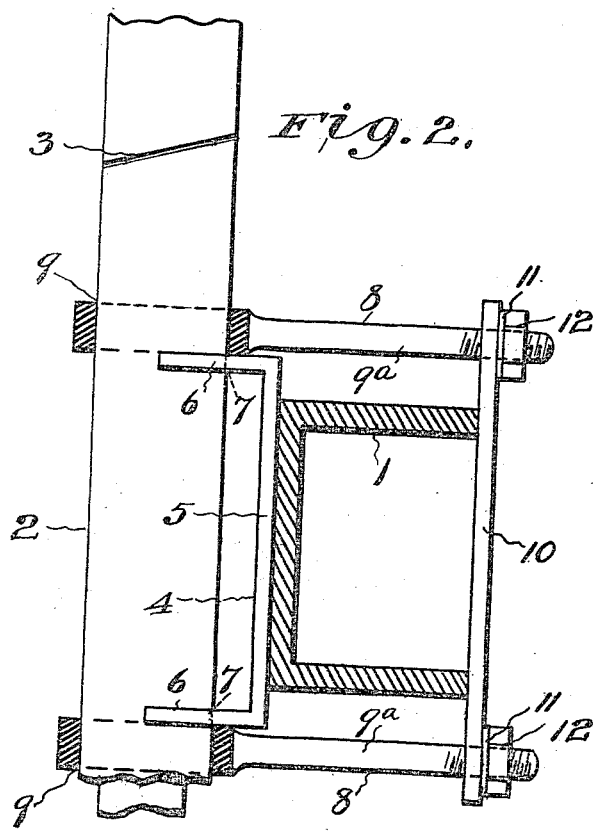
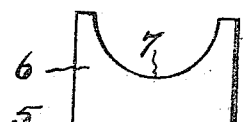

UNITED STATES PATENT OFFICE.

LEWIS R. EWART, OF CODY, WYOMING.

LAMP-MOUNTING ATTACHMENT FOR VEHICLES.

1,266,239.     Specification of Letters Patent.     Patented May 14, 1918.

Application filed August 2, 1917. Serial No. 184,019.

*To all whom it may concern:*

Be it known that I, LEWIS R. EWART, a citizen of the United States, residing at Cody, in the county of Bighorn and State of Wyoming, have invented certain new and useful Improvements in Lamp-Mounting Attachments for Vehicles, of which the following is a specification.

My invention relates to improvements in lamp-mounting attachments for vehicles, and more particularly for automobiles.

The object of my invention is to provide means for mounting a lamp or lamps on an automobile or other vehicle, the said lamp or lamps being capable of being adjusted forwardly and rearwardly and fixed at any desired point.

A further object of my invention is to provide means for mounting a lamp which may be attached to any and all kinds of vehicles.

A further object of my invention is to provide means for mounting a lamp, preferably of the dirigible variety, which will always throw the light in the direction of travel of the vehicle on which it is mounted, whether it be in a straight course or on a curve, and capable of being adjusted to fit all kinds of vehicles.

A still further object of my invention is to provide means for mounting a lamp on an automobile or other vehicle which is simple, inexpensive, and durable in construction, easy to apply, and very effective in use.

The invention consists in the several features and in the construction, combination, and arrangement of features, as more fully hereinafter described and claimed.

Referring to the drawings, Figure 1 is a top plan view of a portion of the channel side bar of an automobile with my invention mounted thereon ready for use; Fig. 2, a vertical sectional view; and Fig. 3, a detail end view of the spacing plate.

In the drawings, in which similar reference characters denote corresponding parts throughout the several views, 1 represents a section or portion of the channel side bar of an automobile, 2 a lamp-shaft supporting sleeve or socket adapted to receive a lamp-shaft 3, adapted to carry a lamp, preferably adapted to move therein in order to allow the lamp-shaft carrying the lamp to turn therein.

A plate 4 is provided between the channel side bar of the automobile and the lamp-supporting sleeve or socket for the purpose of spacing the channel side bar from the lamp-shaft supporting sleeve or socket, which comprises a flat central portion 5, adapted to rest against the channel side bar and being provided with a plurality of lugs 6, preferably two in number, extending at an angle to the central portion 5, and each provided with a semicircular recess 7 adapted to closely fit over and rest on the outer surface or contour of the lamp-shaft supporting sleeve or socket 2.

In order to securely clamp or bind the lamp-shaft supporting-socket to the channel bar two bolts 8 are provided, each having an eye 9, which encircles the lamp-shaft supporting sleeve or socket, and shanks 9ª, which pass through holes in a plate 10, resting against the channel bar, and provided on their outer ends with washers 11 and nuts 12, by which the several parts are held securely and firmly to the channel bar of the automobile.

In order to apply the device, the eyes 9 of the bolts are first inserted over the lamp-shaft supporting-sleeves, the spacing plate 4 put in place, and the device placed on the channel bar with the spacing bar resting against the closed side of the channel bar and the bolts above and below the same. The plate 10 is then put in place against the open or channel side of the channel bar and the nuts screwed up tightly on the bolts.

When it is desired to move the device forward or backward on the channel bar, it is only necessary to loosen the nuts 12, and after the device has been adjusted to the desired point to direct the rays of light the proper distance down the road to tighten or screw the nuts 12 up again. This feature of forward and backward adjustment of my invention is a very important one.

I do not wish to be understood as limiting myself to the specific details of construction and arrangement as herein described and illustrated, as it is manifest that variations and modifications may be made in the features of construction and arrangement, in the adaptation of the device to various conditions of use, without departing from the spirit and scope of my invention and improvements.

I therefore reserve the right to all such variations and modifications as properly fall within the scope of my invention and the terms of the following claims.

Having thus described my invention, what I claim is—

1. In a lamp mounting attachment for automobiles, a plurality of bolts having eyes for encircling the lamp-sleeve, a spacing-plate having angular ends adapted to contact with the said lamp-sleeve and a middle portion spaced therefrom, and nuts on the bolts adapted to be screwed up and clamp the several parts together.

2. In a lamp mounting attachment for automobiles, a plurality of bolts having integral annular eyes for encircling the lamp-sleeve, a spacing plate having lugs at an angle to its middle portion provided with recesses adapted to contact with the said lamp-sleeve, and means for clamping the several parts together.

3. In a lamp mounting attachment for automobiles, a plurality of bolts having integral eyes for encircling the lamp-sleeve, a plate adapted to contact with one side of the channel side bar of an automobile, a plate adapted to contact with the other side of the channel side bar, said plate having its middle portion spaced from the lamp-sleeve and its ends contacting therewith, and means for clamping the several parts together and to the channel side bar.

4. In a lamp mounting attachment for automobiles, a plurality of bolts having eyes for encircling the lamp-sleeve, a plate having a middle portion one face of which is adapted to contact with the channel side bar of an automobile and the other face spaced from the lamp-sleeve, lugs having recesses substantially semicircular adapted to contact with the said lamp-sleeve, and means connected with the bolts for clamping the lamp-sleeves and plate to the channel side bar.

5. In a lamp mounting attachment for automobiles, a lamp-sleeve, a plurality of eye-bolts adapted to be connected with the lamp-sleeve, a plate having lugs with semi-circular recesses adapted to engage the said sleeve and one side of the channel bar of an automobile, and a middle portion spaced from the said sleeve, a plate through which the eye-bolts pass engaging the other side of the channel side bar, and nuts on the bolts for clamping the several parts together and to the said channel side bar.

In testimony whereof I affix my signature in the presence of two witnesses.

LEWIS R. EWART.

Witnesses:
   FRED R. PEARSON,
   THOS. J. KANE.

Copies of this patent may be obtained for five cents each, by addressing the "Commissioner of Patents, Washington, D. C."